US012663390B2

(12) United States Patent
Wu et al.

(10) Patent No.: US 12,663,390 B2
(45) Date of Patent: Jun. 23, 2026

(54) DEVICE AND METHOD FOR DETECTING CURIE TEMPERATURE OF PERMANENT MAGNET MATERIAL

(71) Applicant: CHINA JILIANG UNIVERSITY, Hangzhou (CN)

(72) Inventors: Qiong Wu, Hangzhou (CN); Hangfu Yang, Hangzhou (CN); Xiukun Hu, Hangzhou (CN); Zisheng Wang, Hangzhou (CN); Hongliang Ge, Hangzhou (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 390 days.

(21) Appl. No.: 18/681,090

(22) PCT Filed: Mar. 13, 2023

(86) PCT No.: PCT/CN2023/081047
§ 371 (c)(1),
(2) Date: Feb. 5, 2024

(87) PCT Pub. No.: WO2024/168964
PCT Pub. Date: Aug. 22, 2024

(65) Prior Publication Data
US 2025/0123226 A1 Apr. 17, 2025

(30) Foreign Application Priority Data
Feb. 15, 2023 (CN) .......................... 202310156652.3

(51) Int. Cl.
*G01N 25/12* (2006.01)

(52) U.S. Cl.
CPC .................................... *G01N 25/12* (2013.01)

(58) Field of Classification Search
CPC ........ G01N 25/12; G01N 25/00; G01N 27/00; Y02B 30/00
See application file for complete search history.

(56) References Cited

U.S. PATENT DOCUMENTS 5,108,191 A * 4/1992 Leu ........................ G01N 27/72
374/176
2016/0209257 A1 * 7/2016 Wang .................... G01F 1/8495

FOREIGN PATENT DOCUMENTS

CN 1036835 A 11/1989
CN 202362442 U * 8/2012
JP 2019184338 A 10/2019

* cited by examiner

*Primary Examiner* — John E Breene
*Assistant Examiner* — Manuel Salvador Castellon, Jr.
(74) *Attorney, Agent, or Firm* — Bayramoglu Law Offices LLC

(57) ABSTRACT

A device and method for detecting Curie temperature of a permanent magnet material is provided, and relates to the technical field of magnetic material detection. The device includes a detection coil, two ends of the detection coil are respectively fixed by a sample fixing tube; a temperature test box arranged inside the detection coil, the temperature test box is provided with a piercing hole for a permanent magnet material sample to be tested to pass in and out, the temperature test box is communicated with a temperature control device; a temperature sensor arranged in the temperature test box; and a magnetic flux integrator connected with the detection coil.

6 Claims, 2 Drawing Sheets

DEVICE AND METHOD FOR DETECTING CURIE TEMPERATURE OF PERMANENT MAGNET MATERIAL

CROSS REFERENCE TO RELATED APPLICATION

This application is a national stage entry of International Application No. PCT/CN2023/081047, filed on Mar. 13, 2023, which is based upon and claims foreign priority to Chinese Patent Application No. 202310156652.3, filed on Feb. 15, 2023, the entire contents of which are incorporated herein by reference.

TECHNICAL FIELD

The disclosure relates to the technical field of magnetic material detection, in particular to a device and a method for detecting Curie temperature of a permanent magnet material.

BACKGROUND

Substance is composed of atoms, and the atoms are composed of atomic nucleus and electrons moving around the atomic nucleus. In the atoms, the electrons have spin magnetic moment because of their spin motion, and the electrons have orbital magnetic moment because of their motion around the atomic nucleus. The magnetic moment of the atoms mainly depends on the magnetic moment of the electrons, which is the essential reason why magnetic substances are magnetic. But for the magnetic materials, they are not always magnetic. Because if the ambient temperature is too high, the original magnetic domain structure of the atom will change, mainly as follows: with the increase of temperature, the intensification of thermal motion of metal lattice will directly affect the orderly arrangement of the magnetic moment of the magnetic domain structure. When the temperature rises to a certain critical value, thermal disturbance will destroy the arrangement of magnetic moment of magnetic domain structure, at which time the magnetic domain structure will be disintegrated and then the magnetic moment will become zero. At the same time, a series of ferromagnetic properties (such as magnetostriction, high permeability, hysteresis loop and the like) associated with the magnetic domain structure will all disappear, and the permeability of corresponding ferromagnetic substance will be transformed into the permeability of paramagnetic substance, which will lead to the disappearance of the magnetic properties of the substance.

Therefore, ferromagnetic/ferrimagnetic materials will have a Curie temperature Tc, which is a critical temperature value for the mutual transformation between the spin-ordered ferromagnetic state and the spin-disordered paramagnetic state in the magnetic material. The Curie temperature Tc reflects the main physical parameters of the internal magnetic properties of the magnetic material and is one of the basic characteristics of the magnetic material. The Curie temperature can characterize the temperature range of the magnetic material application, which is of great significance for the development and design of corresponding magnetic devices. Ferromagnetic/ferrimagnetic materials undergo transformation between ferromagnetic and paramagnetic near the Curie temperature, and their physical properties also are changed. Based on this basic principle, many methods for detecting the Curie temperature have been developed.

However, a vibration sample magnetometer method and a magnetic weighing method, which are widely used at present, are difficult to achieve application in enterprises because of their expensive equipment, complicated operation, strict requirements on detection environment and only suitable for small sample testing.

Therefore, it is an urgent problem for those skilled in the art to provide a detection device and a detection method for detecting Curie temperature simply and rapidly.

SUMMARY

In view of this, the disclosure provides a device and a method for detecting the Curie temperature of a permanent magnet material, aiming at solving the problems in the above background art and realizing simple and rapid detection of the Curie temperature of the permanent magnet material.

In order to achieve the above purpose, on the one hand, the disclosure provides a device for detecting Curie temperature of the permanent magnet material, and the technical scheme is as follows:

A device for detecting Curie temperature of permanent magnet material includes:

- a detection coil, two ends of the detection coil are respectively fixed by a sample fixing tube;
- a temperature test box arranged inside the detection coil, the temperature test box is provided with a piercing hole for a permanent magnet material sample to be tested to pass in and out, and the temperature test box is communicated with a temperature control device;
- a temperature sensor arranged in the temperature test box;
- a magnetic flux integrator connected with the detection coil.

In some embodiments, the piercing hole is arranged at a center of a top of the temperature test box, and the temperature test box is coaxially arranged with the detection coil.

In some embodiments, the sample fixing tube has an integral structure, the detection coil is sleeved on the sample fixing tube, the temperature test box is arranged inside the sample fixing tube, and a position of the temperature test box corresponds to a position of the detection coil.

On the other hand, a method for detecting Curie temperature of a permanent magnet material is provided. The method is carried out by the device mentioned above, the method includes:

- preheating a magnetic flux integrator;
- setting the magnetic flux integrator to zero before placing a permanent magnet material sample to be tested in a temperature test box;
- saturating and magnetizing the permanent magnet material sample to be tested and then connecting the permanent magnet material sample to be tested to a connecting rod, extending the permanent magnet material sample to be tested into the temperature test box through a piercing hole via the connecting rod, and locating the permanent magnet material sample to be tested at a center of the temperature test box;
- setting multiple temperature collection points between a room temperature and a highest measured temperature, controlling a temperature in the temperature test box by a temperature control device to rise from the room temperature to each of the temperature collection points sequentially, drawing a detection coil or the permanent magnet material sample to be tested or rotating the permanent magnet material sample to be tested to generate an electrical signal after a temperature of the permanent magnet material sample to be tested and a temperature in the temperature test box reach thermal balance at each of the temperature collection points, and recording a current temperature in the temperature test box and a corresponding magnetic moment data.

According to the above technical scheme, compared with the prior art, the embodiment provides a device and a method for detecting Curie temperature of the permanent magnet material. The permanent magnet material sample to be tested is placed in the temperature test box located in the detection coil, the temperature in the temperature test box is changed by the temperature control device, and the magnetic flux in the detection coil is changed by a drawing method, so that the Curie temperature of the permanent magnet material sample to be tested at the corresponding temperature is detected. The detection device of the embodiment can simply and quickly detect the Curie temperature of the permanent magnet material, and has a simple structure, which is suitable for industrial popularization and application.

BRIEF DESCRIPTION OF THE DRAWINGS

In order to explain the technical scheme in the embodiment of the disclosure or the prior art more clearly, the drawings needed in the description of the embodiment or the prior art will be briefly introduced below. Apparently, the drawings in the following description are only embodiments of the present disclosure. For those of ordinary skilled in the art, other drawings can be obtained according to the provided drawings without creative efforts.

Figure 1:
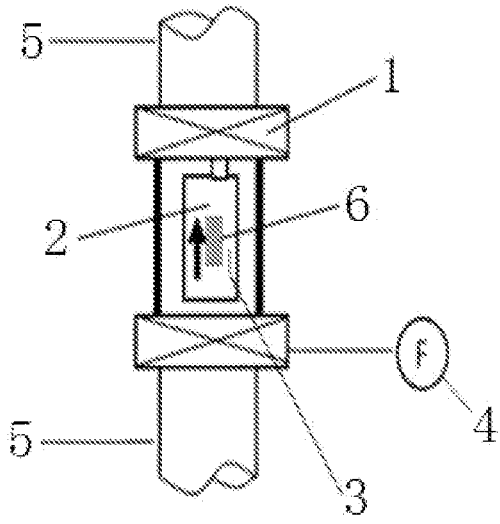
FIG. 1 is a schematic structural diagram of a device for detecting Curie temperature of a permanent magnet material according to the disclosure.

List of the reference characters: 1 detection coil; 2 temperature test box; 3 temperature sensor; 4 magnetic flux integrator; 5 sample fixing tube; 6 permanent magnet material sample to be tested.

DETAILED DESCRIPTION OF THE EMBODIMENTS

In the following, the technical scheme in the embodiment of the disclosure will be described clearly and completely with reference to the attached drawings in the embodiments of the present disclosure. Apparently, the described embodiment is only a part of the embodiment of the present disclosure, not all of them. Based on the embodiments in this disclosure, all other embodiments obtained by those of ordinary skilled in the art under the premise of not making creative efforts belong to the scope of protection in this disclosure.

On the one hand, referring to FIG. 1, a device for detecting Curie temperature of the permanent magnet material is provided, which includes:

a detection coil 1, two ends of the detection coil 1 are respectively fixed by a sample fixing tube 5;

a temperature test box 2 arranged inside the detection coil 1, the temperature test box 2 is provided with a piercing hole for a permanent magnet material sample to be tested 6 to pass in and out, and the temperature test box 2 is communicated with a temperature control device;

a temperature sensor 3 arranged in the temperature test box 2;

a magnetic flux integrator 4 connected with the detection coil 1.

It should be noted that the detection coil 1 is a Helmholtz coil, and other suitable coils can also be used. The detection coil 1 should be calibrated periodically. The detection coil 1 is in a uniform area of the magnetic field, and the uniformity of the magnetic field should reach 1%, and a size of the uniform area is at least 1.5 times that of the permanent magnet material sample to be tested 6. The temperature test box 2 is made of a non-conductive magnetic material. When a temperature of the temperature test box 2 is between room temperature and 200° C., the maximum permissible error of the temperature does not exceed 2.0° C. When the temperature of the temperature test box 2 is 200° C.~1000° C., the maximum permissible error of the temperature does not exceed 3.0° C. The size of the temperature test box 2 should ensure that it can be placed inside the detection coil 1. The highest temperature of the temperature test box 2 should be able to reach the Curie temperature of the permanent magnet material sample to be tested 6. The magnetic flux integrator 4 measures the magnetization through the induced voltage change of the permanent magnet material sample to be tested 6 during the drawing or rotating in the detection coil 1, and the magnetic flux integrator 4 should be calibrated regularly. The maximum permissible error of thermocouple of the temperature sensor 3 should be better than +0.75% or −0.75%, and the resolution should be better than 0.1° C.

The temperature in the temperature test box 2 is regulated by the temperature control device, the permanent magnet material sample to be tested 6 is drawn or rotated in the temperature test box 2, and the magnetic moment data corresponding to the temperature is collected by the magnetic flux integrator 4. With the change of the temperature in the temperature test box 2 by the temperature control device, the corresponding magnetic moment data at each temperature are obtained, and finally the m-T curve is drawn. According to the m-T curve, the Curie temperature of the permanent magnet material sample to be tested 6 is obtained.

According to some embodiments of the disclosure, the piercing hole is arranged at a center of a top of the temperature test box 2, and the temperature test box 2 is coaxially arranged with the detection coil 1. By arranging the piercing hole at the center of the top of the temperature test box 2, the permanent magnet material sample to be tested 6 is conveniently extended to the center of the temperature test box 2, so that the measurement accuracy is improved.

According to some embodiments of the disclosure, the sample fixing tube 5 has an integral structure, the detection coil 1 is sleeved on the sample fixing tube 5. The temperature test box 2 is arranged inside the sample fixing tube 5, and a position of the temperature test box 2 corresponds to a position of the detection coil 1. By arranging the sample fixing tube 5 into an integrated structure, the detection coil 1 can slide along the sample fixing tube 5, thereby the change of magnetic flux in the detection coil 1 can also be realized.

On the other hand, a method for detecting Curie temperature of the permanent magnet material is provided, and the method is carried out by the above device. The method includes:

the magnetic flux integrator 4 is preheated;

the magnetic flux integrator 4 is set to zero before the permanent magnet material sample to be tested 6 is placed in the temperature test box 2;

the permanent magnet material sample to be tested 6 is saturated and magnetized and then connected to a connecting rod; the permanent magnet material sample to be tested 6 is extended into the temperature test box 2 through the piercing hole via the connecting rod, and the permanent magnet material sample to be tested 6 is located at a center of the temperature test box 2;

multiple temperature collection points is set between the room temperature and a highest measured temperature, a temperature is controlled in the temperature test box 2 by a temperature control device to rise from the room temperature to each of the temperature collection points sequentially; the detection coil 1 or the permanent magnet material sample to be tested 6 is drawn or the permanent magnet material sample to be tested 6 is rotated to generate an electrical signal after a temperature of the permanent magnet material sample to be tested 6 and a temperature in the temperature test box 2 reach thermal balance at each of the temperature collection points, and a current temperature in the temperature test box 2 and a corresponding magnetic moment data are recorded.

Figure 2:
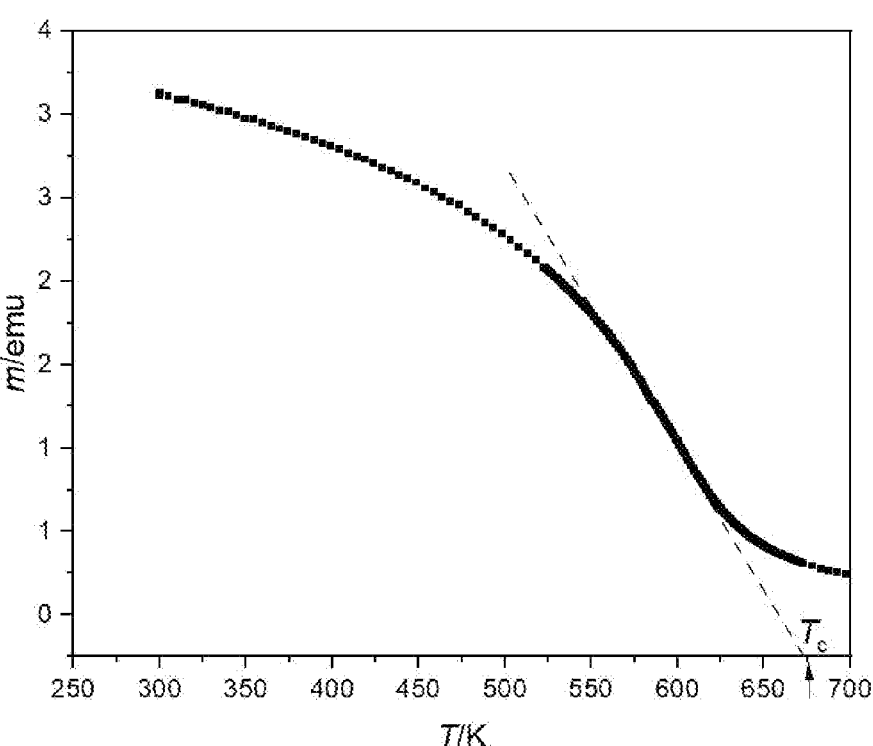
FIG. 2 is an m-T curve graph of a NdFeB cylinder sample with a measured height of 10 mm and a diameter of 10 mm after saturation magnetization by a drawing method according to the disclosure.

Referring to FIG. 2, the permanent magnet material sample to be tested 6 is a NdFeB cylinder sample with a height of 10 mm and a diameter of 10 mm after saturation magnetization. Before measurement, the magnetic flux integrator 4 is preheated for at least 30 min in a energized state. In a state that there is no the permanent magnet material sample to be tested 6 in the detection coil 1, the magnetic flux integrator 4 is set to zero. The NdFeB cylinder sample with a height of 10 mm and a diameter of 10 mm after saturation magnetization is placed at the radial and axial center of the detection coil 1 in the temperature test box 2. The temperature test box 2 gradually heats up from the room temperature. In a range of the room temperature to 520K and 675K to 700K, a point is taken every 5K as a temperature collection point, and in a range of 520K to 675K, one point is taken every 1K as a temperature collection point, and each of the temperature collection points is kept warm for 1 min. After the temperature of the permanent magnet material sample to be tested 6 and the temperature in the temperature test box 2 reach a thermal balance, the induction signal is generated by drawing the detection coil 1 or the permanent magnet material sample to be tested 6, or rotating the permanent magnet material sample to be tested 6. Then, the magnetic moment data is read by the magnetic flux integrator 4, and the temperature of the temperature control device is recorded, and the m-T curve is obtained, as shown in FIG. 2. According to the m-T curve, the Curie temperature of the NdFEB cylinder sample with a height of 10 mm and a diameter of 10 mm after saturation magnetization is the Curie temperature of the NdFeB cylinder sample, and the Curie temperature is about 675K.

Figure 3:
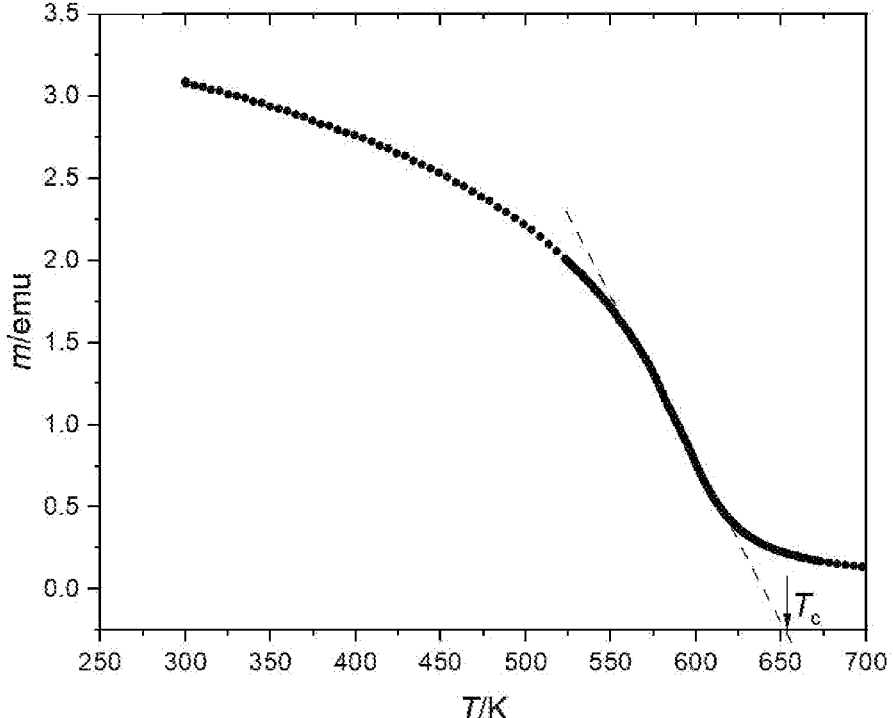
FIG. 3 is an m-T curve graph of the NdFeB cylinder sample with the measured height of 3 mm and the diameter of 3 mm after saturation magnetization by the drawing method according to the disclosure.

Referring to FIG. 3, the permanent magnet material sample to be tested 6 is a NdFeB cylinder sample with a height of 3 mm and a diameter of 3 mm after saturation magnetization. Before measurement, the magnetic flux integrator 4 is preheated for at least 30 min in a energized state. In a state that there is no the permanent magnet material sample to be tested 6 in the detection coil 1, the magnetic flux integrator 4 is set to zero. The NdFeB cylinder sample with a height of 3 mm and a diameter of 3 mm after saturation magnetization is placed at the radial and axial center of the detection coil 1 in the temperature test box 2.

The temperature test box 2 gradually heats up from the room temperature. In a range of the room temperature to 520K and 675K to 700K, a point is taken every 5K as a temperature collection point, and in a range of 520K to 675K, one point is taken every 1K as a temperature collection point, and each of the temperature collection points is kept warm for 0.5 min. After the temperature of the permanent magnet material sample to be tested 6 and the temperature in the temperature test box 2 reach a thermal balance, the induction signal is generated by drawing the detection coil 1 or the permanent magnet material sample to be tested 6, or rotating the permanent magnet material sample to be tested 6. Then, the magnetic moment data is read by the magnetic flux integrator 4, and the temperature of the temperature control device is recorded, and the m-T curve is obtained, as shown in FIG. 3. According to the m-T curve, the Curie temperature of the NdFEB cylinder sample with a height of 3 mm and a diameter of 3 mm after saturation magnetization is obtained, and the Curie temperature is about 652K.

Each embodiment in the description is described in a progressive manner, and each embodiment focuses on its differences from other embodiments, the same and similar parts of each embodiment can be referred to each other. For the device disclosed by the embodiment, the description is relatively simple because it corresponds to the method disclosed by the embodiment, and the relevant information can be referred to the method section.

The above description of the disclosed embodiments enables those skilled in the art to realize or use the disclosure. Many modifications to these embodiments will be apparent to those skilled in the art. The general principles defined herein may be implemented in other embodiments without departing from the spirit or scope of this disclosure. Therefore, the present disclosure is not to be limited to the embodiments shown herein, but conforms to the widest scope consistent with the principles and novel features disclosed herein.

What is claimed is:

1. A device for detecting Curie temperature of a permanent magnet material, comprising:

a detection coil, wherein two ends of the detection coil are respectively fixed by a sample fixing tube;

a temperature test box arranged inside the detection coil, wherein the temperature test box is provided with a piercing hole for a permanent magnet material sample to be tested to pass in and out, and the temperature test box is in communication with a temperature control device;

a temperature sensor arranged in the temperature test box; and a magnetic flux integrator connected to the detection coil.

2. The device for detecting Curie temperature of the permanent magnet material according to claim 1, wherein the piercing hole is arranged at a center of a top of the temperature test box, and the temperature test box is coaxially arranged with the detection coil.

3. The device for detecting Curie temperature of the permanent magnet material according to claim 1, wherein the sample fixing tube has an integral structure, the detection coil is sleeved on the sample fixing tube, the temperature test box is arranged inside the sample fixing tube, and a position of the temperature test box corresponds to a position of the detection coil.

4. A method for detecting Curie temperature of a permanent magnet material, the method being carried out by the device according to claim 1, wherein the method comprises:

preheating the magnetic flux integrator;

setting the magnetic flux integrator to zero before placing the permanent magnet material sample to be tested in the temperature test box;

saturating and magnetizing the permanent magnet material sample to be tested and then connecting the permanent magnet material sample to be tested to a connecting rod, extending the permanent magnet material sample to be tested into the temperature test box through a piercing hole via the connecting rod, and locating the permanent magnet material sample to be tested at a center of the temperature test box;

setting a plurality of temperature collection points between a room temperature and a highest measured temperature, controlling a temperature in the temperature test box by the temperature control device to rise from the room temperature to each of the temperature collection points sequentially, drawing the detection coil or the permanent magnet material sample to be tested or rotating the permanent magnet material sample to be tested to generate an electrical signal after a temperature of the permanent magnet material sample to be tested and a temperature in the temperature test box reach thermal balance at each of the temperature collection points, and recording a current temperature in the temperature test box and a corresponding magnetic moment data.

5. A method for detecting Curie temperature of a permanent magnet material, the method being carried out by the device according to claim 2, wherein the method comprises:

preheating the magnetic flux integrator;

setting the magnetic flux integrator to zero before placing the permanent magnet material sample to be tested in the temperature test box;

saturating and magnetizing the permanent magnet material sample to be tested and then connecting the permanent magnet material sample to be tested to a connecting rod, extending the permanent magnet material sample to be tested into the temperature test box through a piercing hole via the connecting rod, and locating the permanent magnet material sample to be tested at a center of the temperature test box;

setting a plurality of temperature collection points between a room temperature and a highest measured temperature, controlling a temperature in the temperature test box by the temperature control device to rise from the room temperature to each of the temperature collection points sequentially, drawing the detection coil or the permanent magnet material sample to be tested or rotating the permanent magnet material sample to be tested to generate an electrical signal after a temperature of the permanent magnet material sample to be tested and a temperature in the temperature test box reach thermal balance at each of the temperature collection points, and recording a current temperature in the temperature test box and a corresponding magnetic moment data.

6. A method for detecting Curie temperature of a permanent magnet material, the method being carried out by the device according to claim 3, wherein the method comprises:

preheating the magnetic flux integrator;

setting the magnetic flux integrator to zero before placing the permanent magnet material sample to be tested in the temperature test box;

saturating and magnetizing the permanent magnet material sample to be tested and then connecting the permanent magnet material sample to be tested to a connecting rod, extending the permanent magnet material sample to be tested into the temperature test box through a piercing hole via the connecting rod, and locating the permanent magnet material sample to be tested at a center of the temperature test box;

setting a plurality of temperature collection points between a room temperature and a highest measured temperature, controlling a temperature in the temperature test box by the temperature control device to rise from the room temperature to each of the temperature collection points sequentially, drawing the detection coil or the permanent magnet material sample to be tested or rotating the permanent magnet material sample to be tested to generate an electrical signal after a temperature of the permanent magnet material sample to be tested and a temperature in the temperature test box reach thermal balance at each of the temperature collection points, and recording a current temperature in the temperature test box and a corresponding magnetic moment data.

* * * * *